United States Patent
Hinojosa et al.

(10) Patent No.: US 9,577,453 B2
(45) Date of Patent: Feb. 21, 2017

(54) MECHANISM FOR CHARGING AN ELECTRONIC DEVICE WITH A RETRACTABLE CORD REEL

(71) Applicants: Chris Hinojosa, Winthrop Harbor, IL (US); David Mellinger, Chicago, IL (US); John Alford, Kenosha, WI (US); Mark Schwartz, Wauconda, IL (US)

(72) Inventors: Chris Hinojosa, Winthrop Harbor, IL (US); David Mellinger, Chicago, IL (US); John Alford, Kenosha, WI (US); Mark Schwartz, Wauconda, IL (US)

(73) Assignee: Telefonix, Incorporated, Waukegan, IL (US)

(*) Notice: Subject to any disclaimer, the term of this patent is extended or adjusted under 35 U.S.C. 154(b) by 0 days.

(21) Appl. No.: 14/933,950

(22) Filed: Nov. 5, 2015

(65) Prior Publication Data

US 2016/0164325 A1 Jun. 9, 2016

Related U.S. Application Data

(63) Continuation-in-part of application No. 14/145,419, filed on Dec. 31, 2013, now Pat. No. 9,300,123.

(60) Provisional application No. 62/075,690, filed on Nov. 5, 2014.

(51) Int. Cl.
*H02J 7/00* (2006.01)
*H02G 11/02* (2006.01)

(52) U.S. Cl.
CPC ............ *H02J 7/0045* (2013.01); *H02G 11/02* (2013.01); *H02J 7/00* (2013.01)

(58) Field of Classification Search
CPC ..... H02G 11/00; H02G 11/02; B65H 75/4423; B65H 2701/34
See application file for complete search history.

(56) References Cited

U.S. PATENT DOCUMENTS

| | | | | |
|---|---|---|---|---|
| 7,658,625 B2* | 2/2010 | Jubelirer | ............ | H01R 31/065 439/131 |
| 7,871,292 B1* | 1/2011 | Hu | ........ | H01R 13/502 439/501 |
| 8,096,817 B2* | 1/2012 | Lee | ......... | H01R 35/04 439/104 |
| 8,388,352 B1* | 3/2013 | ChongYu | ............ | H01R 24/28 439/11 |
| 8,480,410 B2* | 7/2013 | Early | ............ | H01R 13/665 439/620.21 |
| 2010/0297873 A1* | 11/2010 | Burke | ............ | H02G 11/02 439/501 |
| 2012/0126047 A1* | 5/2012 | Skowronski | ....... | B65H 75/4449 242/388.6 |
| 2012/0168272 A1* | 7/2012 | Skowronski | ....... | B65H 75/4423 191/12.2 R |

* cited by examiner

*Primary Examiner* — Jason C Smith
(74) *Attorney, Agent, or Firm* — Niro Law (57) ABSTRACT

An mechanism for charging an electronic device with a retractable cord reel. The device maintains a substantially continuous converted power source connection during operation, including operations adjusting the length of the retractable cord.

3 Claims, 14 Drawing Sheets

MECHANISM FOR CHARGING AN ELECTRONIC DEVICE WITH A RETRACTABLE CORD REEL

PRIORITY OF INVENTION

This application is a Continuation in Part and claims priority of non-provisional application Ser. No. 14/145,419 filed Dec. 31, 2013 and provisional Application 62/075,690 filed Nov. 5, 2014.

FIELD OF THE INVENTION

The present invention relates generally to providing an adjustable length charging connection for one or more cell phones or similar electronic devices, and more specifically to ensuring a continuous electrical connection and charge during adjustment of the cord reel, while permitting all of the electrical connectors to be retracted within a shell or housing while not in use. Cords used for charging batteries in cell phones, laptops, and the like may be used with the present invention such that, when retracted, can be safely stored and protected from entanglement, the elements and damage.

BACKGROUND OF THE INVENTION

With the increasing use of mobile electronic products including smart phones, laptop computers, tablet and the like, the need for low cost, compact power supplies and solutions to power and recharge these products also continues to increase. Most manufacturers of mobile products typically provide plug-in power adapters along with these mobile products to help provide the power supply needs of their customers.

Today's power adapters are typically AC-to-DC power converters which are configured to convert an AC voltage to a DC voltage delivered to the mobile device. For example, users can power most mobile devices by simply plugging the adapter into a standard AC wall outlet commonly found in most homes and offices. Such devices, however, are often bulky and clumsy, with the AC-to-DC adapters having a "brick" configuration, with each cord (i.e., the cord connecting the converter to the device, and the cord connecting the converter to an outlet both dangling loose and creating safety and damage risks for the user and the equipment.

Although these power adapters conveniently provide direct power and recharging capabilities, users are often required to carry separate adapters to provide power to each individual mobile device. This often means that users have to carry multiple adapters to power all the multiple devices, thereby increasing the amount of bulk a user is required to carry, which is also tedious.

Accordingly, there exists a need for a power converter and system that resolves the system power management problems associated with carrying all of the different power supply components necessary to power a wide variety of mobile and portable devices having different power requirements. Moreover, there is a need for a power converter and system that reduces the space requirements for power cables, the possible tangling thereof, and improves the ease of use of the power converter by a user.

The cord reel assembly described here relates to needs for features improving the robustness of the electrical connection for supplying converted power between a source and the device, even when the length of the connecting cord is being adjusted. The invention further relates to the ability to connect to and supply power to multiple devices, including multiple devices at the same time. The invention also relates to safely store such multiple cords or connectors when not in use.

The present invention relates generally to addressing needs related to charging devices for mobile phone or similar electronic device include a retractable cord reel. More specifically, such needs include a retractable cord reel which may have the ability to connect with multiple form factors, including multiple devices at the same time, while retracting inside of a streamlined profile to avoid entanglement when not in use. Further, the need for a converted power supply connector the need to ensure the continuous supply of power to the device(s) being charged, even when the length of the cord is being adjusted, e.g., due to the movement of the user and the mobile device.

DEFINITION OF TERMS

The following terms are used in the claims of the patent as filed and are intended to have their broadest plain and ordinary meaning consistent with the requirements of the law:

A "retractable cord reel" refers to a cable storage unit and cable management systems having a spooling cord such as the type found in U.S. Pat. No. 5,094,396 to Burke, the subject matter of which is hereby incorporated by reference, and U.S. Patent Application No. 2007/0262185 to Burke, the subject matter of which is also hereby incorporated by reference.

A "housing" means a rigid casing that reels, encloses and protects a spool, and further protects a cord when retracted. The housing may, but need not further include a recess or cavity for receiving and protecting an electrical connector, such as an electrical plug or connector when retracted.

A "spool" means a cylinder around which an electrical cord can be wound; a reel. The spool further comprises two faces or borders connected to the cylinder and having a larger diameter than the cylinder therebetween so as to enable the cord to be wound around the cylinder.

A "spring contact" means a flexible contact which maintains a substantially constant electrical communication with the conductive face of the spool. The spring contact is substantially fixed in position but flexible so as to accommodate continuing electrical communication during the rotational movement of the spool.

Where alternative meanings are possible, the broadest meaning is intended. All words used in the claims set forth below are intended for use in the normal, customary usage of grammar and the English language.

SUMMARY OF THE INVENTION

The present invention relates to one or more of the following features, elements or combinations thereof.

One disclosed embodiment is directed to a device including a retractable cord reel for connecting a power source (e.g., a wall outlet) to an electronic device (e.g., a mobile phone, laptop or the like), including a mechanism for converting the power source to an appropriate form for use in the electronic device. The charging station includes a housing for retaining a cord reel which can be adjusted in length according to the needs of the user. Storing the cord on a reel helps protect safety hazards to the equipment or the user when not in use. The present invention particularly provides a mechanism for maintaining a substantially consistent electrical connection between the power source and the device, even when the cord reel is being adjusted in length, the mechanism including one or more metallic springs for contacting a conductive face of the spool on the cord reel during rotation of the spool.

Another embodiment of the present invention further includes safety features for enabling the storage of the entirety of one or more electrical connections in the device, including the power outlet plug (which can be folded into a recess in the housing of the device) and the retractable cord plug (which can be retained in another recess in the housing when fully retracted). Further, the housing can include a second connector (e.g., a female connector) to enable connection to a second form factor of connection and/or a second electronic device.

Thus, it can be seen that one object of the disclosed invention is to provide a continuous converted electrical supply charge to an electronic device even during the adjustment in length of any connecting cables.

A further object of the present invention is to provide a housing for storing the entirety of electrical connectors coupling a power supply to a mobile device or the like when not in use.

Another object of the invention is to provide multiple electrical connectors coupling a power supply to more than one form factor of mobile device connection.

Still another object of the present invention is to provide multiple electrical connectors coupling a power supply to more than one mobile device or the like at the same time.

It should be noted that not every embodiment of the claimed invention will accomplish each of the objects of the invention set forth above. For instance, certain claimed embodiments of the invention will not require the ability to attach to multiple electronic devices, or multiple electronic devices at the same time. In addition, further objects of the invention will become apparent based upon the summary of the invention, the detailed description of preferred embodiments, and as illustrated in the accompanying drawings. Such objects, features, and advantages of the present invention will become more apparent in light of the following detailed description of an example embodiment thereof, and as illustrated in the accompanying drawings.

BRIEF DESCRIPTION OF THE DRAWINGS

FIG. 5a-c is a front and side views of an alternative, modular device in accord with another preferred embodiment of the present invention.

FIGS. 7a-c shows a USB power plug feature in accord with another preferred embodiment of the present invention.

FIGS. 10a-e show front, left, right, top and bottom view of a main housing module in accord with yet another preferred embodiment of the present invention.

FIGS. 11a-e show front, left, right, top and bottom view of a main housing module in combination with a wall power plug module in accord with yet another preferred embodiment of the present invention.

FIGS. 12a-e show front, left, right, top and bottom view of a main housing module in combination with a USB power plug module in accord with yet another preferred embodiment of the present invention.

DETAILED DESCRIPTION OF EMBODIMENTS OF THE INVENTION

Figure 1A:
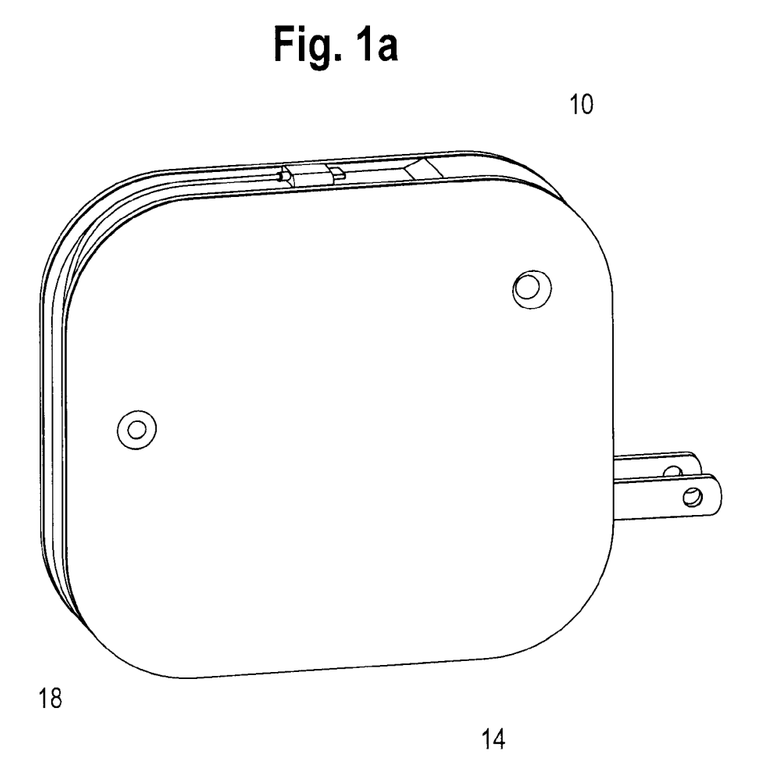
FIGS. 1a and 1b are perspective and exposed perspective figures of a charging device in accord with a preferred embodiment of the present invention.
Figure 1B:
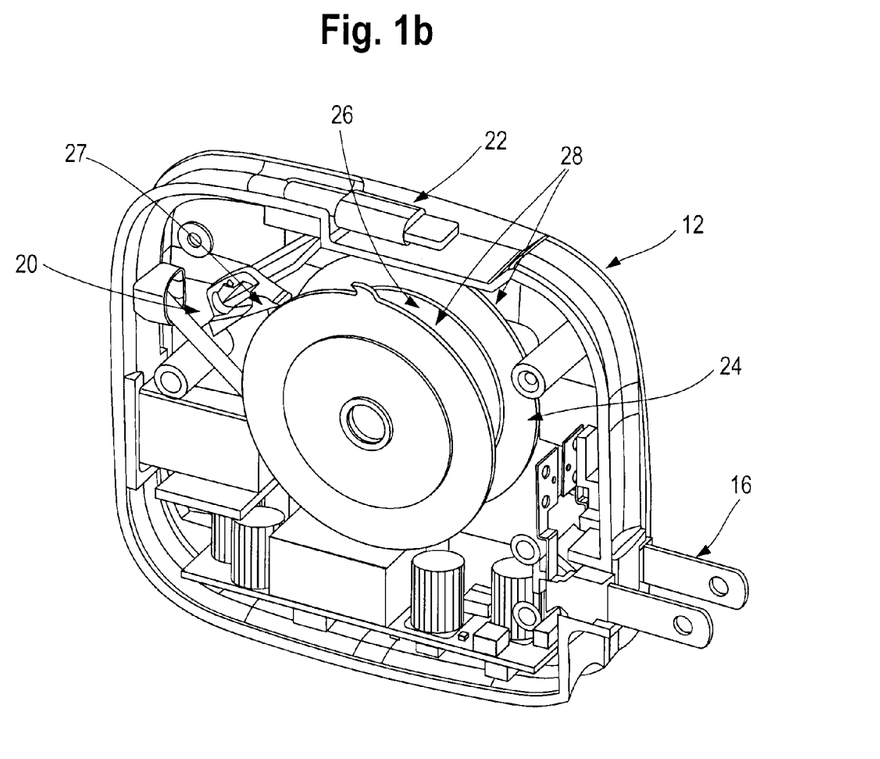

As can be seen in FIGS. 1a and 1b, the device 10 includes a housing 12 with a first end 14 that has a power source connector 16, such as a wall plug connector extending therefrom to connect to a wall outlet (not shown) or the like. The second end 18 has an extendable cord 20 extending therefrom which terminates in a device connector 22 of a desired form factor type to mate with a mobile phone, laptop or the like (not shown). The cord can be retracted around a spool 24 through a "pull to stow" mechanism such as those known to persons of ordinary skill in the art. The spool 24 includes a cylinder 26 for winding the cord 20 around, as well as two faces 28 on each end of the cylinder 26. The spool 24 is spring biased for retraction and held at the desired point of unwinding by a non-conductive ratchet 27 which contacts a corresponding on the circumference of at least one face 28.

Figure 2:
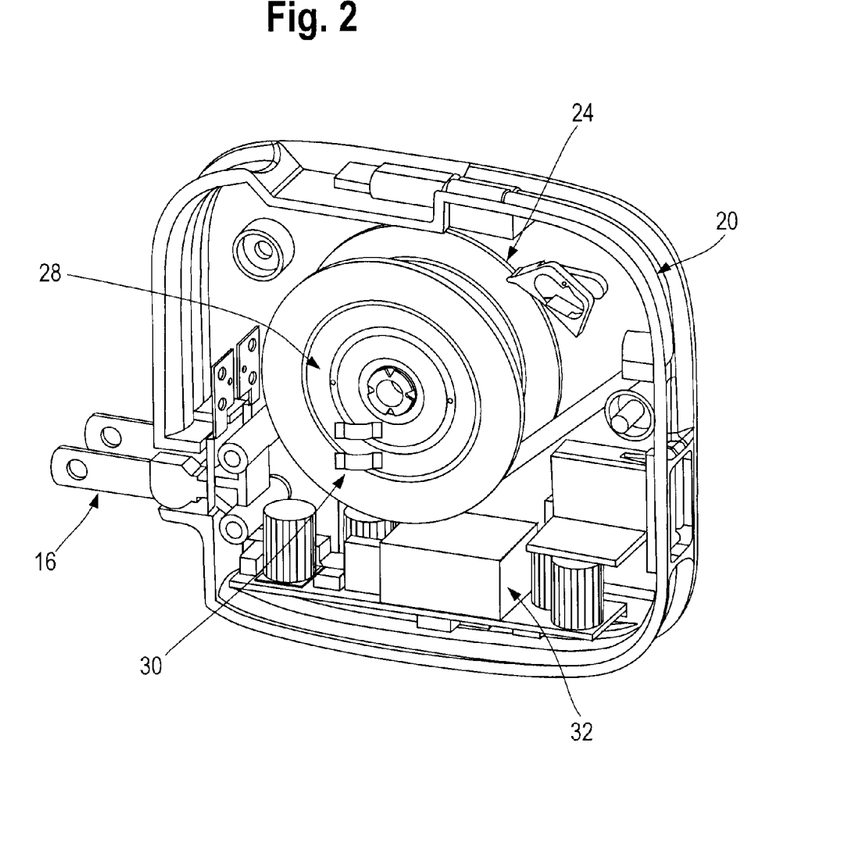
FIG. 2 is a perspective figure of spring fingers engaging a face of the cord reel in accord with one preferred embodiment of the present invention.

As shown in FIG. 2, at least one of the faces 28 includes a conductive surface (e.g., metallic) which contacts a number of spring contacts 30 which electrically contact the spool 24 to a printed circuit board 32 which converts the power received from the power source connector 16 to the desired current form for transmission through the spool 24 to the cord 20.

Figure 3:
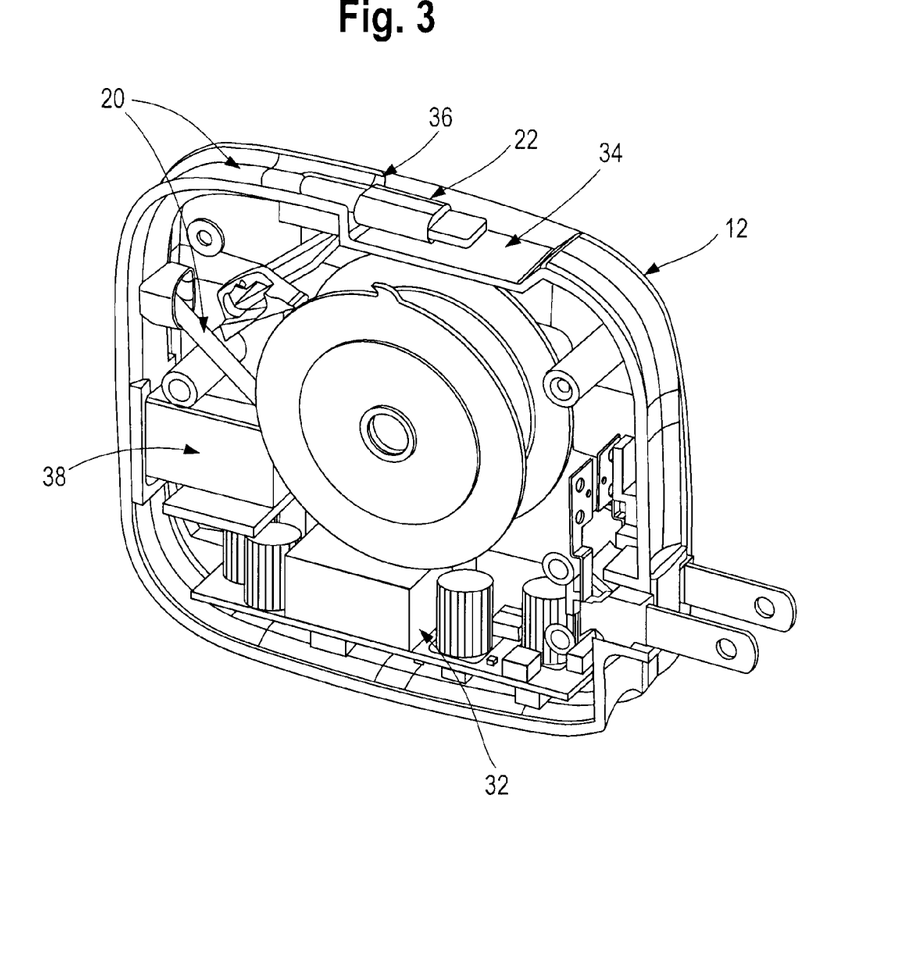
FIG. 3 is side view the multiple form factor electrical connectors and the housing recess for retaining such connectors in accord with a preferred embodiment of the present invention.

As shown in the alternative embodiment of FIG. 3, the cord 20 and the device connector 22 may be fully retracted such that neither extends beyond the periphery of the housing 12. Specifically, while substantially all of the cord 20 can pass through the second end 18 opening to wind around the cylinder 26, the device connector 22 is too wide to pass through. However, the housing 12 includes a first recess 34 sized for receiving the device connector 22 and a mount 36 for engaging the device connector 22 when fully retracted. Thus, the device connector 22 is fully retained within the profile of the housing 12 when fully retracted, thus eliminating the clutter and safety hazards presented by having loose cords or connectors on the device 10 when not in use.

Furthermore, in this alternative embodiment, the housing 12 includes a second, female connector 38 with its own electrical connection to the circuit board 32. This embodiment thus permits a user, if desired, to connect more than one different form factor of connector to a single power converter, or more than one device at a time to the same power converter.

Figure 4:
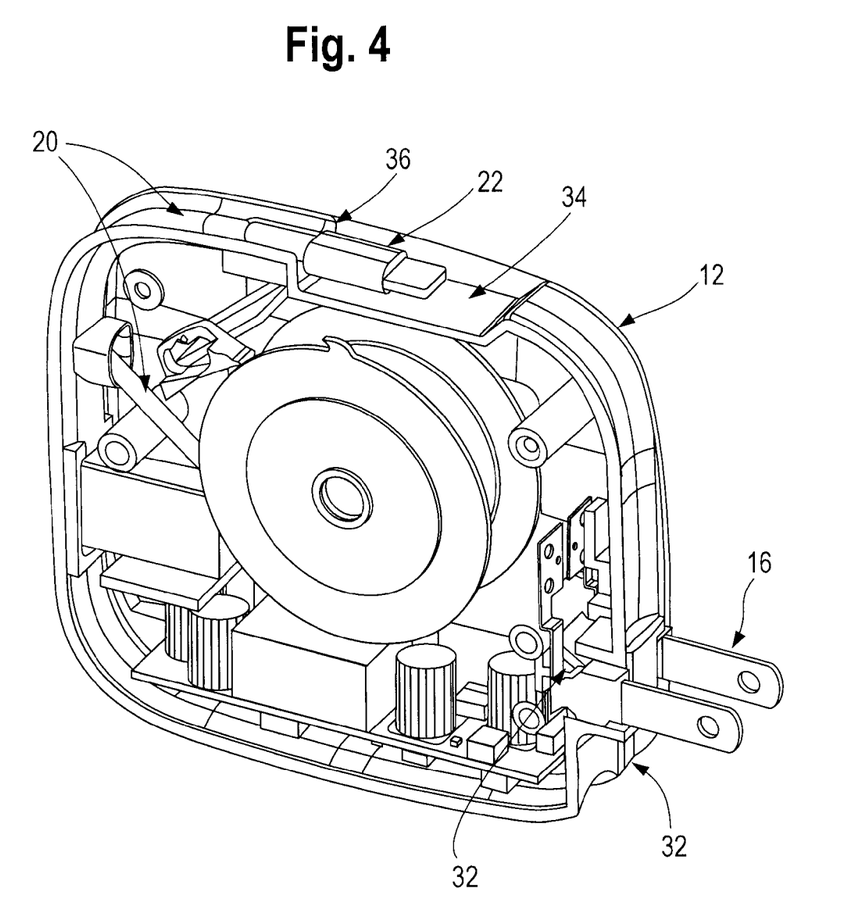
FIG. 4 is a side view of the foldable plug detail for connecting to a power source in accord with a preferred embodiment of the present invention.
Figure 5A:
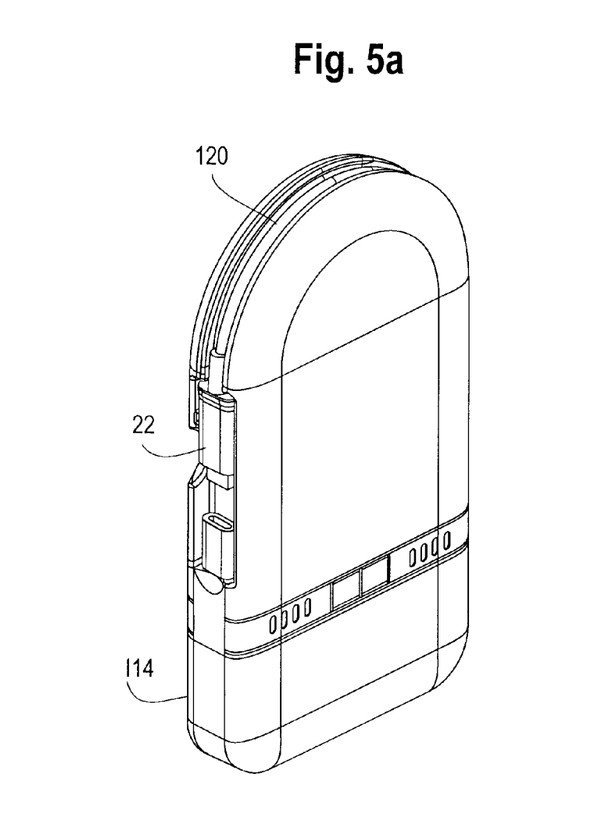
Figure 5B:
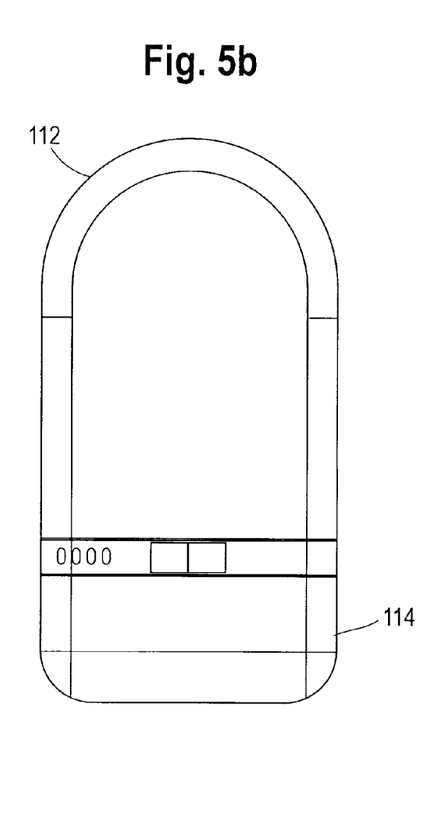
Figure 5C:
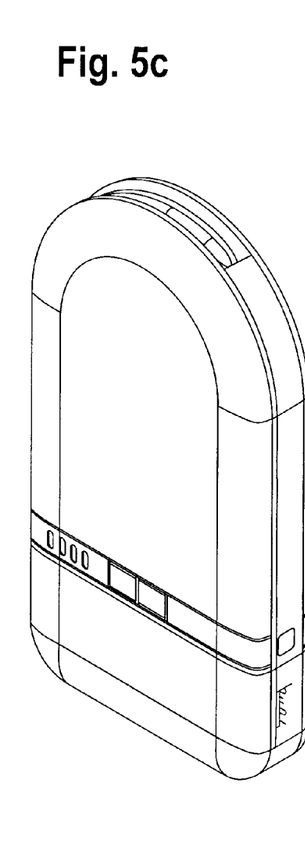
Figure 6:
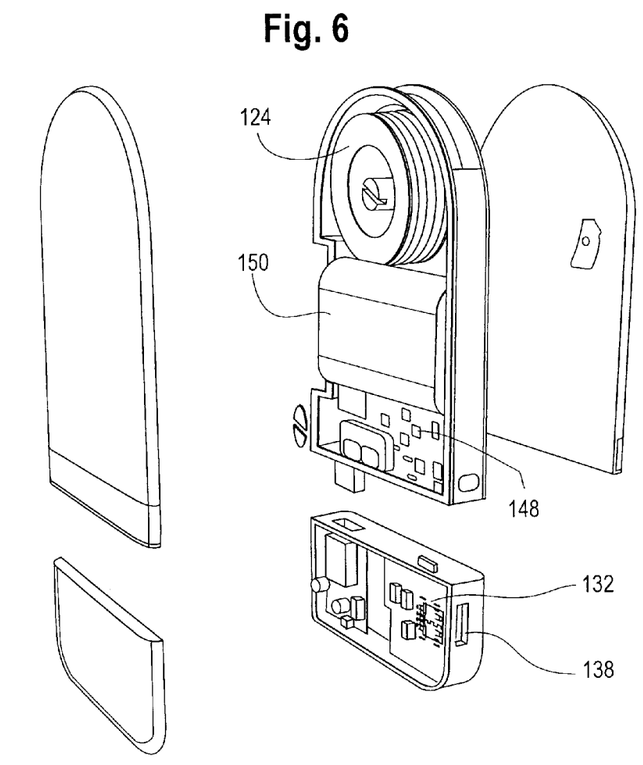
FIG. 6 is an exploded view of an alternative, modular device in accord with another preferred embodiment of the present invention.
Figure 7A:
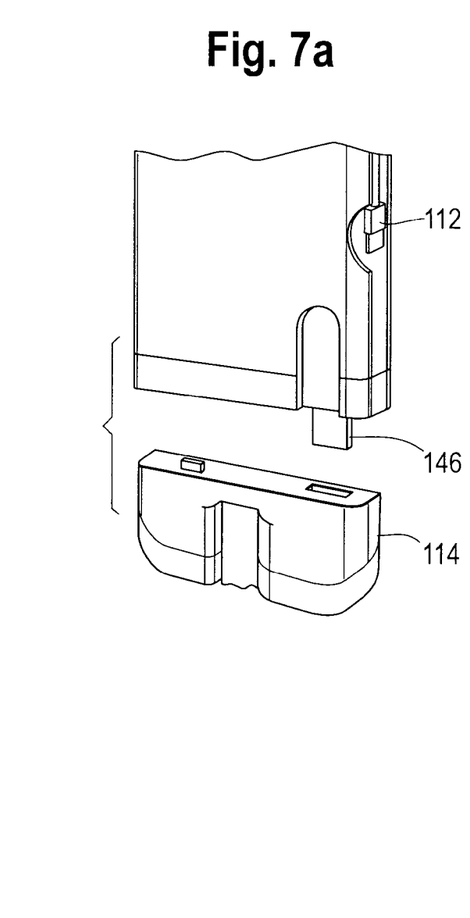
Figure 7B:
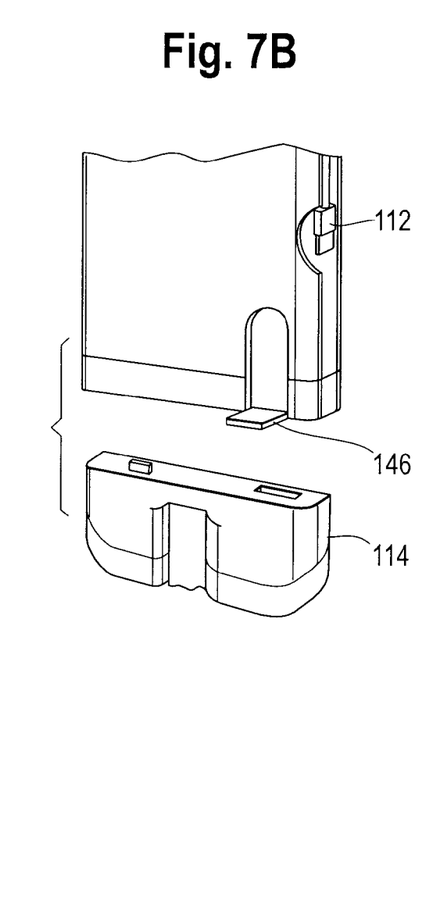
Figure 7C:
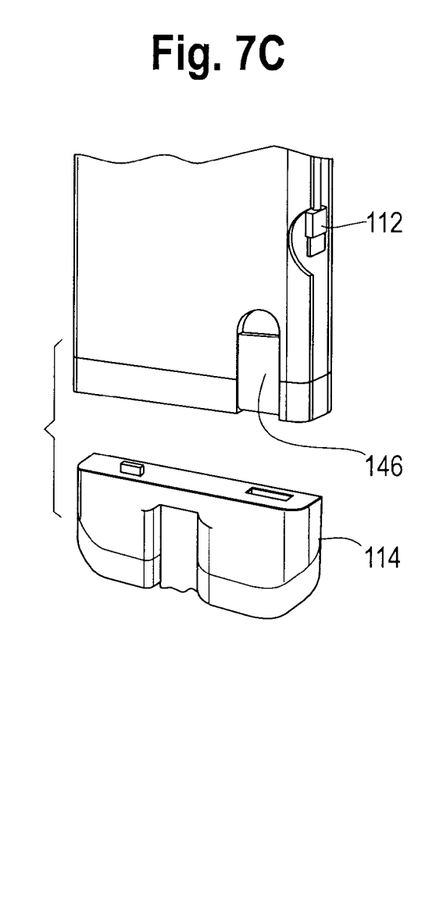
Figure 8:
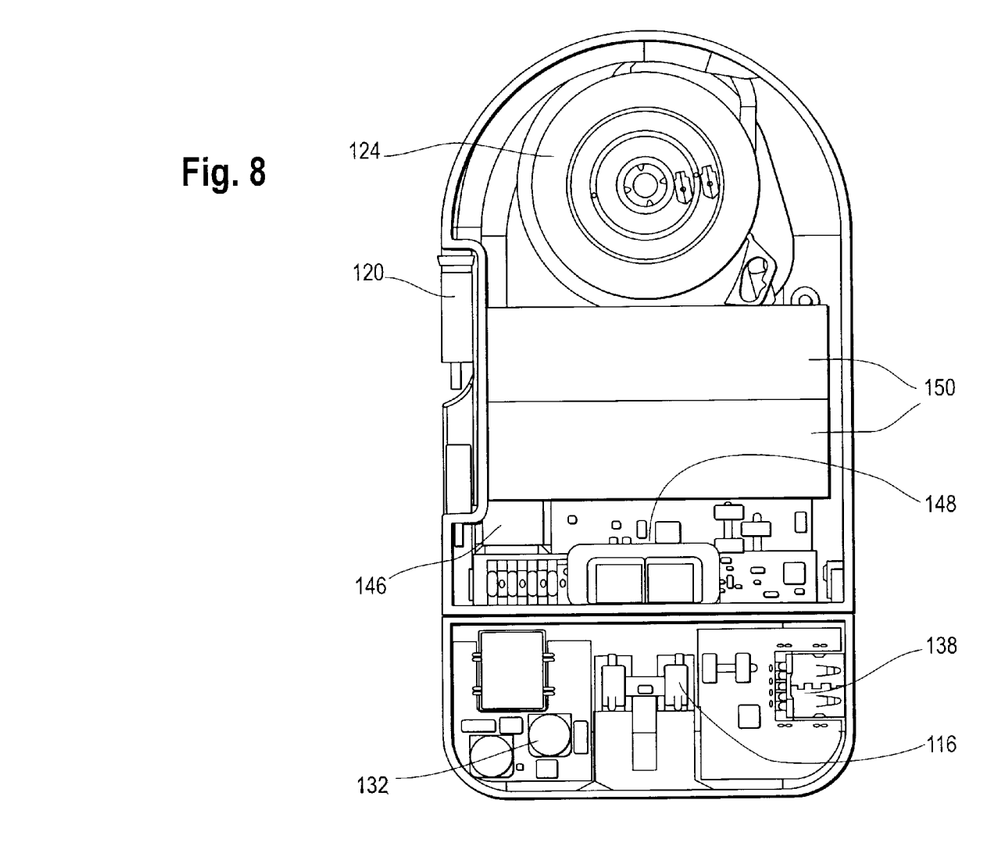
FIG. 8 shows a front exposed view of an alternative, modular device in accord with another preferred embodiment of the present invention.
Figure 9A:
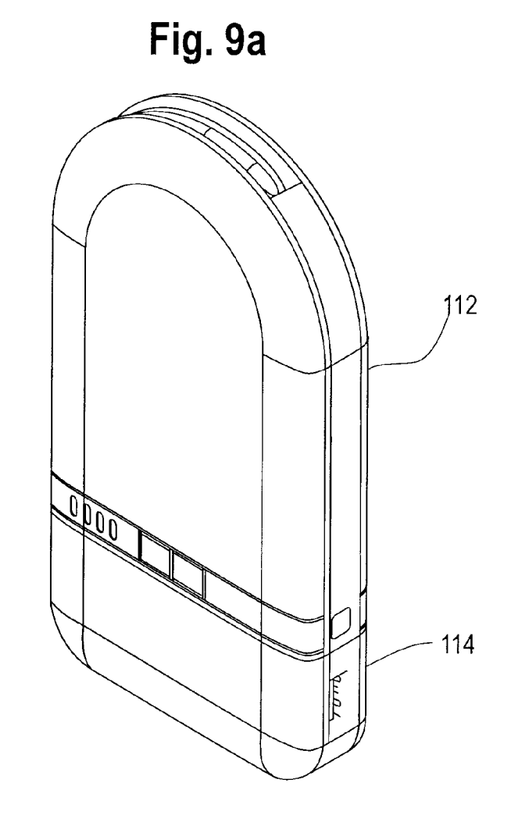
FIGS. 9a-b show left and right perspective view an alternative, modular device in accord with another preferred embodiment of the present invention.
Figure 9B:
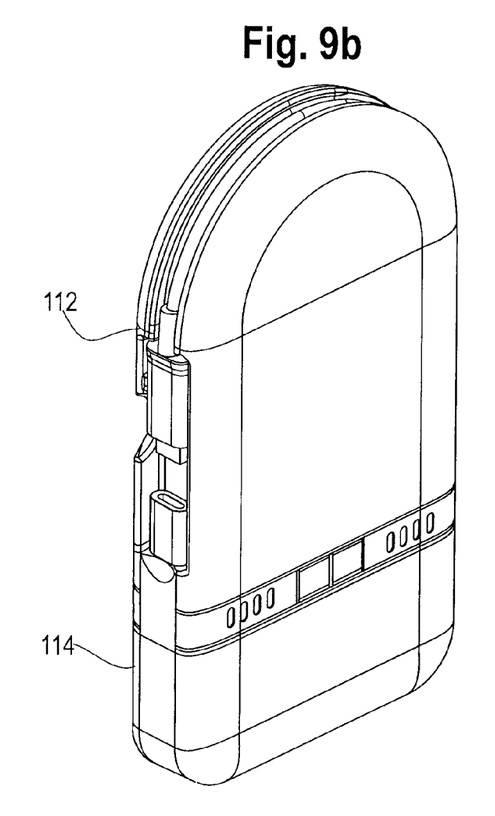
Figure 10A:
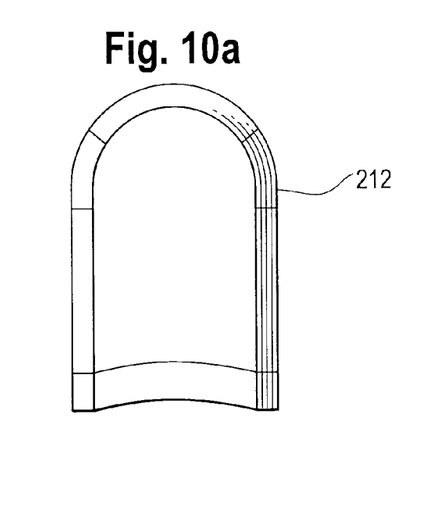
Figure 10B:
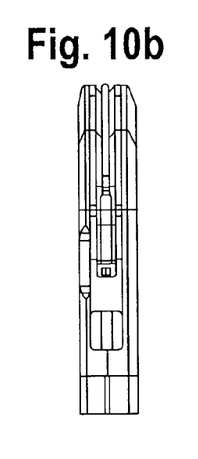
Figure 10C:
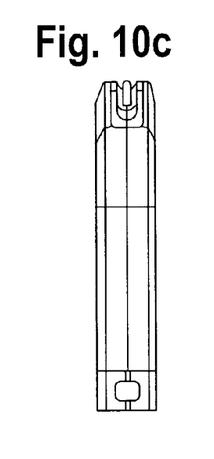
Figure 10D:
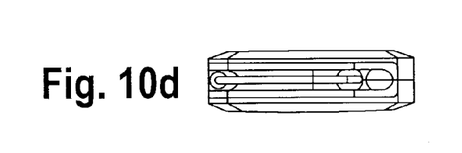
Figure 10E:
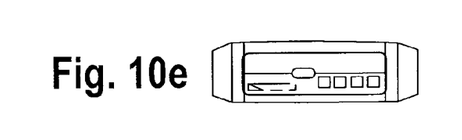
Figure 11A:
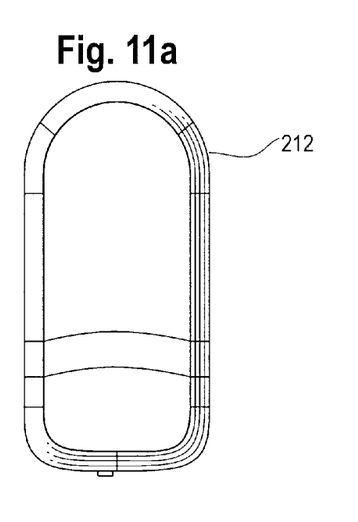
Figure 11B:
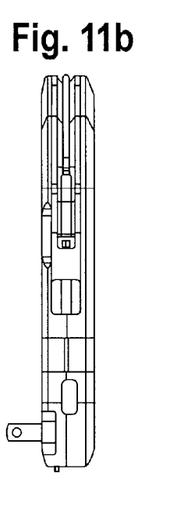
Figure 11C:
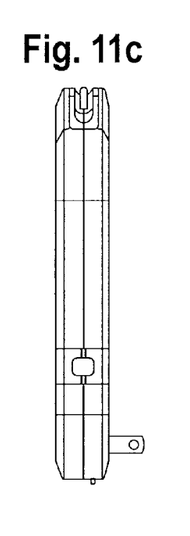
Figure 11D:
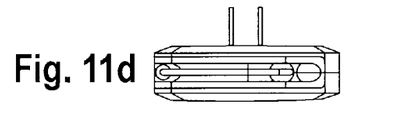
Figure 11E:
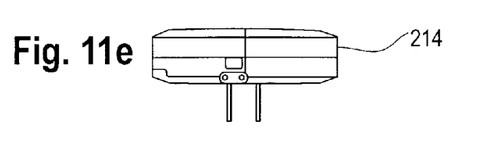
Figure 12A:
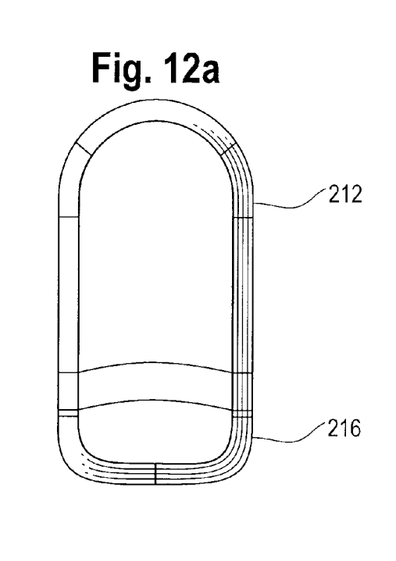
Figure 12B:
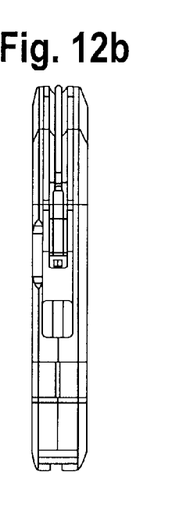
Figure 12C:
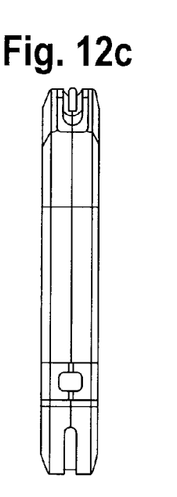
Figure 12D:
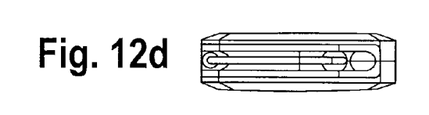
Figure 12E:
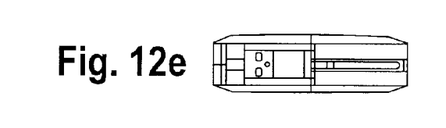
Figure 13:
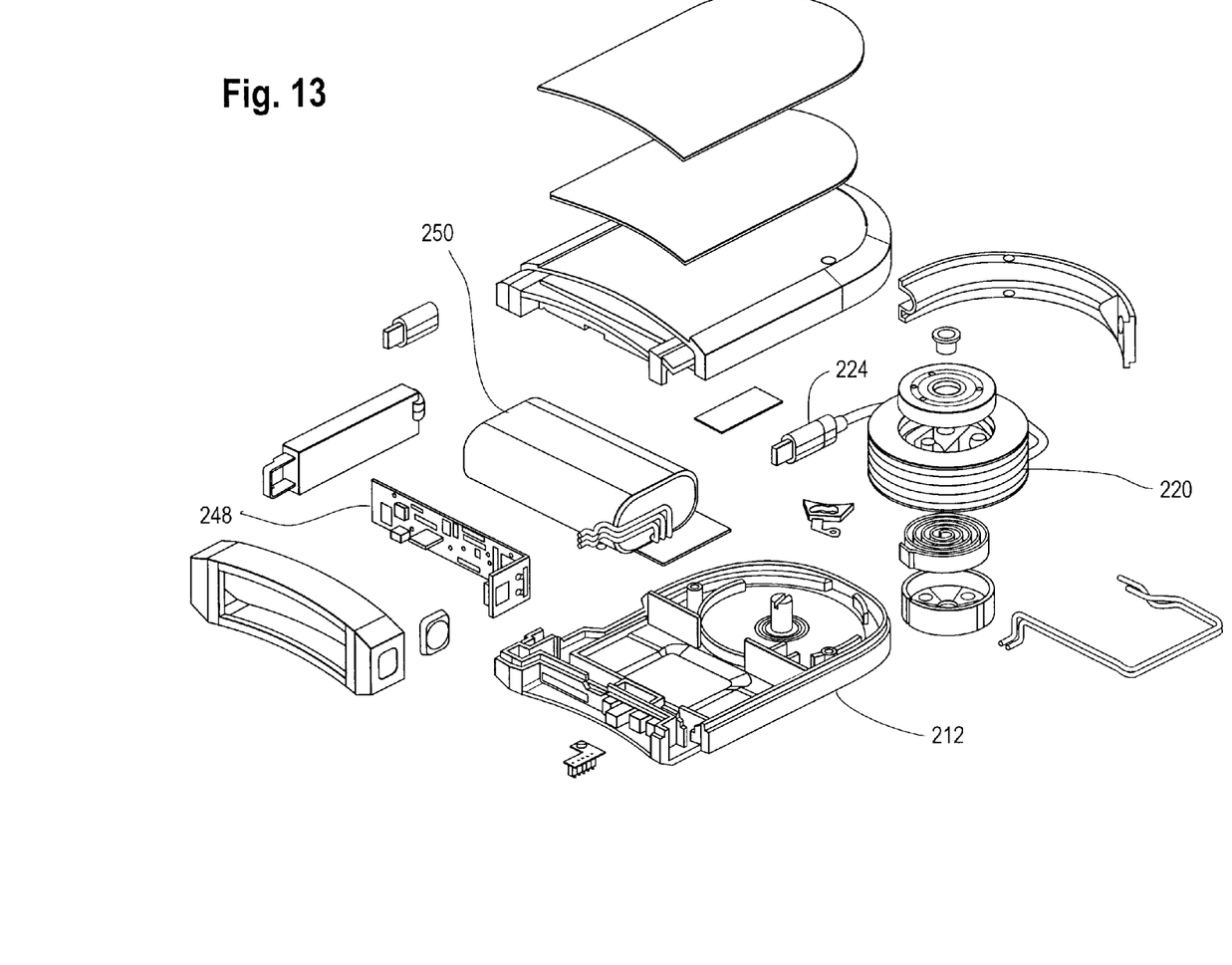
FIG. 13 shows an exploded view of a main housing module in accord with yet another preferred embodiment of the present invention.

In another preferred embodiment as shown in FIG. 4, the device 10 includes a power source connector 16 connected to the housing 12 via a hinged connection 40. The housing further includes a second, power connector recess 42, which enables the plug or power source connector to be folded within the profile of the housing 12 when not in use, thus eliminating another source of potential damage to the device 10 when not in use.

In still another embodiment, as shown in FIGS. 5-9, the device 110 includes a main housing 112 and a modular AC charging unit 114. This embodiment works generally in the same manner as the embodiments of FIGS. 1-4, with the addition of a battery 150, and with the use of the modular AC unit. In this embodiment the device 110 still has at least one power plug connected to the housing 112 in the form of folding wall plug 116 or a folding USB plug 146. In addition, the circuit board functionality is split between the main housing unit 112 and the modular AC charging unit 114. Specifically the main housing 112 includes a DC charging unit, while the modular AC charging unit 114 includes an AC charging circuit 132. With this configuration, the device 110 can swap between an AC power source (such as a wall plug), a DC power source (such as a USB connection) or a battery source in the absence of any outside power source.

In still a further embodiment, as shown in FIGS. 9-13, the device 210 includes a main housing 212 with a separate wall mount power plug module 214 and a USB power plug module 216. In any configuration, the main housing 212 includes a power plug connector 246, such as a USB connector or the like which permits connections that facilitate swapping between wall mount power plug module 214 and USB power plug module 216. Thus, in this embodiment, the device 210 can swap between an AC power source (such as a wall plug) by using the separate wall mount power plug module 214 as shown in FIG. 11, a DC power source (such as a USB connection) USB power plug module 216 or by relying upon the battery source 250 in the absence of any connection to an outside power source. Further, it should be noted that the connection with main housing 212 and any separate module may be done by placing a male or female power plug connector 246 on the main housing, with a reciprocal connector (not shown on) the wall mount power plug module 214 and a USB power plug module 216.

While the disclosure is susceptible to various modifications and alternative forms, specific exemplary embodiments thereof have been shown by way of example in the drawings and have herein been described in detail. It should be understood, however, that there is no intent to limit the disclosure to the particular embodiments disclosed, but on the contrary, the intention is to cover all modifications, equivalents, and alternatives falling within the spirit and scope of the disclosure as defined by the appended claims.

What is claimed is:

1. A retractable cord reel apparatus comprising:
   a) a housing;
   b) a spool positioned within the housing and arranged for rotation relative to the housing, the spool having a conductive surface along one face;
   c) a retractable cord have a distal end and a proximate end, the retractable cord capable of being extended from and retracted into the housing so as to wrap around the spool during retraction, the proximate end of the retractable cord electrically communicating with the conductive surface of the spool;
   d) at least one fixed, conductive contact for enabling continuous conductive contact with the conductive surface;
   e) a power plug fixably connected relative to the housing for providing power to the retractable cord through electrical communication via the fixed conductive contact and the conductive surface of the spool; and
   f) a printed circuit board electrically communicating with the fixed, conductive contact so as to provide direct current supply to the retractable cord.

2. The retractable cord reel apparatus of claim 1, wherein the power plug is a folding power plug.

3. The retractable cord reel apparatus of claim 1, further comprising a ratchet for mechanically maintaining the spool position for a desired extension of the retractable cord during use, wherein the ratchet is a non-conductive ratchet.

* * * * *